Patented Mar. 27, 1934

1,952,163

UNITED STATES PATENT OFFICE 1,952,163

UPHOLSTERY ARTICLE AND METHOD FOR PRODUCING THE SAME

Walter George Gorham, Erdington, Birmingham, England, assignor to Dunlop Rubber Company, Limited, London, England, a British company No Drawing. Application August 12, 1932, Serial No. 628,546. In Great Britain September 15, 1931

12 Claims. (Cl. 18—59)

This invention relates to a method for the production of upholstery, mattresses and the like articles of resilient nature containing sponge or cellular rubber.

It has been found that in the construction of sponge rubber upholstery, the provision of graded hardness may be of importance. In upholstery for instance, a gradation of hardness from a softer upper or surface region to a harder lower or base region has been found to give greater comfort in use.

Furthermore, upholstery is often made so as to present a rounded, domed or bolstered appearance.

The use of sponge or cellular rubber to produce the softer upper or surface region, or the rounded, domed or bolstered appearance may not be desirable.

The object of the present invention is to apply compositions of resilient fibrous materials, particularly horse-hair treated with aqueous dispersions of the kinds hereinafter specified in the production of sponge or cellular rubber upholstery, mattresses and the like articles of resilient nature.

Thus, in the combination of sponge or cellular rubber and rubber-treated resilient fibrous materials produced according to the present invention, the sponge or cellular rubber fulfills the main function of supporting the load whilst the resilient fibrous material may, for certain applications such as shaping, give greater comfort in use and also permits, if desired, the construction of a domed, rounded or bolstered appearance.

According to the present invention, the method for the production of upholstery, mattresses and the like articles of resilient nature containing sponge or cellular rubber, comprises forming shapes or blocks of sponges or cellular rubber preferably directly from aqueous dispersions of the kinds hereinafter specified, and combining with the aforesaid shapes or blocks resilient fibrous materials, particularly horsehair which is or has been treated by contacting with aqueous dispersions of rubber or the like materials.

The shapes or blocks of cellular rubber are preferably produced from aqueous dispersions which have been converted into a frothy condition wherein the froth comprises the gas and the dispersion aforesaid still in the reversible condition.

Furthermore, if desired, these dispersions may be those which are or can be rendered capable of gelling on the application of heat, or to which substances have been added to cause the aqueous emulsions to gel in the cold after a definite and controllable time interval.

The treated fibrous materials, particularly horsehair, can be applied to a latex froth prior to its setting, or to the rubber sponge produced prior to its drying and vulcanization.

The aqueous dispersions may be derived from natural or artificial aqueous dispersions of rubber, balata, gutta-percha or similar vegetable resins, or artificial dispersions of coagulated rubber, vulcanized rubber, synthetic rubbers, waste or reclaim rubber or mixtures of any of the aforesaid dispersions in concentrated and/or compounded condition or, alternatively, in a condition obtained by compounding and then concentrating.

The compounding ingredients comprise the use of additions such as fillers, reinforcing agents, vulcanizing agents, accelerators and softeners.

The concentrates such as are described and claimed in Patent 1,846,164, Feb. 23, 1932, to which any one or more of the usual compounding ingredients can be added, are particularly suitable for use, especially if subsequently diluted to a concentration of about 40% total solids or less.

The aforesaid dispersions can also be used in a frothy condition wherein the froth comprises a gas and the dispersions aforesaid still in the reversible condition. For instance, the processes described and claimed in Patent 1,852,447 April 5, 1932, can be employed in connection with the present invention.

The following are examples of carrying the invention into effect.

Example I

A mold of, for example, rectangular section is taken and filled with a froth produced from an aqueous rubber dispersion according to Patent 1,852,447. This froth is so conditioned as, for instance, by adding a suitable quantity of sodium silicofluoride that, after a short period of standing, it will set, but before the time of setting, a thin layer of rubber-treated hair is distributed in the surface of the foam, so that on setting, a portion of the hair is firmly bonded with the set foam. After setting, further hair is distributed on top of the initial hair layer, and this hair is treated with an aqueous dispersion of rubber, for example, by spraying. This procedure is repeated where necessary until the desired shape has been attained. The whole mass is then vulcanized in known manner.

*Example II*

A sponge rubber block suitable for forming the basis of the required combination is taken and treated on the surface to which the hair is to be applied with a rubber solution, preferably of a vulcanizing type. A quantity of hair is applied to the solutioned block, the hair being either built up on the block into the desired shape and rubbered in situ, or the hair is first built up and rubbered by known means and then applied to the solutioned block.

What is claimed is:

1. A method for the production of upholstery, mattresses and the like articles of resilient nature which comprises forming shapes or blocks of cellular rubber from aqueous dispersions of rubber material, and combining with the aforesaid shape or blocks resilient fibrous materials treated by contacting with aqueous dispersions of rubber-like materials.

2. A method as claimed in claim 1 wherein the treated fibrous materials are applied to a latex froth prior to its setting.

3. A method as claimed in claim 1 wherein the treated fibrous materials are applied to the rubber sponge produced prior to its drying and vulcanization.

4. A method for the production of upholstery which comprises shaping a mass of foamed, aqueous rubber dispersion, and partially embedding a fibrous material in said shaped mass.

5. A method for the production of upholstery which comprises shaping a mass of aqueous rubber dispersion, partially embedding a fibrous material in said shaped mass, and drying and vulcanizing said mass.

6. A method for the production of upholstery which comprises shaping a mass of aqueous rubber dispersion, partially embedding a fibrous material in said shaped mass, coating the exposed fibres of said material with rubber latex, and curing the resulting structure.

7. A method of forming upholstery which comprises forming a foam of an aqueous dispersion of rubber material to a shaped mass, partly embedding a rubber-treated fibrous material in the surface of said mass, setting said mass of foam, adding additional fibrous material to the exposed part of said partly embedded fibrous mass, spraying the added material with aqueous rubber dispersion, and vulcanizing the resulting structure.

8. A method of forming upholstery which comprises forming a foamed aqueous dispersion of rubber material to a shaped mass, and bonding a fibrous material to a surface of said mass.

9. The method of claim 8 in which the fibres of the fibrous mass are coated with rubber material.

10. An upholstery article comprising a mass of unmasticated rubber foam and a mass of fibrous material embedded in a surface thereof.

11. An upholstery article comprising a mass of unmasticated rubber foam and a mass of rubberized fibrous material embedded in a surface thereof.

12. An upholstery article of resilient nature comprising shapes or blocks of unmasticated rubber foam in combination with resilient fibrous materials coated with unmasticated rubber.

WALTER GEORGE GORHAM.